United States Patent

[11] 3,583,339

| [72] | Inventors | Wolfgang Kube, Ludwigshafen, Germany |
| [21] | Appl. No. | 882,208 |
| [22] | Filed | Dec. 4, 1969 |
| [45] | Patented | June 8, 1971 |
| [73] | Assignee | Badische Anilin & Soda Fabrik Aktiengesellschaft, Ludwigshafen (Rhineland), Pfalz, Germany. |
| [32] | Priority | Dec. 6, 1968 |
| [33] | | Germany |
| [31] | | P1813012.6 |

[54] BURNING AQUEOUS LIQUIDS
9 Claims, 2 Drawing Figs.

| [52] | U.S. Cl. | 110/7 |
| [51] | Int. Cl. | F23g 7/00 |
| [50] | Field of Search | 110/7, 8, 7 S |

[56] References Cited
UNITED STATES PATENTS

| 3,340,830 | 9/1967 | Frey et al. | 110/7 |
| 3,357,375 | 12/1967 | Brophy | 110/7S |
| 3,472,186 | 10/1969 | Osterman | 110/8 |

FOREIGN PATENTS

| 1,165,349 | 9/1969 | Great Britain | 110/8 |

Primary Examiner—Kenneth W. Sprague
Attorney—Johnston, Root, O'Keeffe, Keil, Thompson and Shurtleff ABSTRACT: Process for the combustion of organic substances contained in aqueous effluents, wherein the effluent is first introduced into an offgas cooler downstream of a combustion chamber, additional heat being supplied if necessary, the effluent is kept therein at a higher pressure than the pressure prevailing in the combustion chamber and heated to a temperature which is below the boiling temperature at this pressure. The liquid is heated, at at least the critical pressure, to at least the critical temperature and the pressure is released so that partial vaporization takes place. The resultant vapor phase of organic substances is burned in the combustion chamber together with the nonvaporized organic substances at a temperature sufficient for complete combustion of the organic substances.

PATENTED JUN 8 1971 3,583,339

INVENTOR:
WOLFGANG KUBE
BY
Johnston, Root, O'Keeffe, Keil, Thompson & Shurtleff
ATT'YS

BURNING AQUEOUS LIQUIDS

This invention relates to a process for burning organic substances contained in aqueous effluents in a combustion chamber with an offgas cooler arranged downstream thereof, the aqueous liquid being passed through the offgas cooler on the coolant side with or without the supply of additional heat, heated under superatmospheric pressure and then fed into the combustion chamber.

The combustion of organic substances contained in aqueous effluents in prior art combustion plant has always been carried out with the addition of an auxiliary fuel such as oil or gas. The auxiliary fuel serves the purpose of maintaining a supporting flame which vaporizes some of the water present in the aqueous effluent so that the effluent becomes more concentrated and burns spontaneously owing to the improvement in the calorific value and ignitability of the organic substances. A high consumption of auxiliary fuel is associated with the maintenance of the supporting flame because the amount of heat required to evaporate the water if fairly large. If it is desired to recover at least some of the additional heat introduced into the combustion plant with the auxiliary fuel, it is necessary to provide downstream of the combustion plant a waste heat boiler for the production of heating steam.

Preliminary evaporation of the aqueous effluent is not possible in most cases because volatile constituents of the effluent (for example organic substances which owing to their odor or their toxicity have to be burnt and thus destroyed in the combustion chamber) would pass into the vapor phase together with the water fraction.

Economical recovery of heat introduced with the auxiliary fuel is also excluded when using submerged burners because the aqueous effluents are usually vaporized at atmospheric pressure and the vapor formed can therefore reach a maximum temperature of only 100° C. The vapors formed are moreover not brought tot the temperature necessary for complete combustion of readily volatile substances.

Another known method concerns the wet-air oxidation of sludge. In this method the sludge concentrate is heated up with live steam, oxidized by passing air through it for several hours and then drained. The maximum temperatures reached in the oxidation substances which are volatile in steam are not oxidized by the wet-air oxidation.

It is an object of the present invention to provide a process for burning all organic substances contained in aqueous effluents in which little or no auxiliary fuel is supplied depending on the calorific value of the aqueous effluent, and a large part of the heat contained in the offgas from the combustion plant is recovered in an economical manner.

This object is achieved in a process for burning organic substances contained in aqueous effluents in a combustion chamber with an offgas cooler arranged downstream thereof, the aqueous effluent being passed through the offgas cooler on the coolant side, with or without the supply of additional heat, thus heated up under superatmospheric pressure, and then fed into the combustion chamber, by keeping the aqueous effluent in the offgas cooler under a pressure higher than the pressure in the combustion chamber, heating the effluent to a temperature which is below the boiling temperature at the prevailing pressure and to at least the critical temperature at at least the critical pressure, vaporizing part of the effluent by flashing to a lower pressure and burning the resultant vapor phase of organic substances together with the nonvaporized organic substances in the combustion chamber at a temperature sufficient for complete combustion of the organic substances. It is advantageous to feed aqueous liquid into the combustion chamber together with an auxiliary fuel. Releasing the pressure and partly vaporizing the aqueous effluent is carried out in the burner nozzle. It is also possible to flash the aqueous liquid in a zone upstream of the burner nozzle to an intermediate pressure higher than the combustion chamber pressure so that it is partly vaporized and to supply the resultant vapor phase of organic substances to the combustion chamber separately from the liquid phase of nonvaporized organic substances. In the latter method the vapor phase may also be used as an auxiliary vapor for atomizing the liquid phase may also be used as an auxiliary vapor for atomizing the liquid phase and the liquid auxiliary fuel entering the burner nozzle. The method also offers the advantage of supplying the vapor phase to the burner nozzle as auxiliary vapor which serves only for atomizing the liquid phase. It is also possible to supply the vapor phase as auxiliary vapor to the burner nozzle for atomization of only the liquid auxiliary fuel. In the case of a very high water content of the effluent it has proved to be advantageous to mix at least some of the vapor phase of the aqueous effluent flashed to a higher pressure than the combustion chamber pressure with the burned gas in the combustion chamber while bypassing the burner nozzle. It may also be advantageous, when an auxiliary fuel is added, to mix this with the liquid phase of the aqueous effluent flashed to a pressure higher than the combustion chamber pressure prior to being fed into the burner nozzle.

Any aqueous solutions or suspensions which contain organic constituents and inorganic salts or ions which form inorganic salts in the combustion and which cannot be separated by distillation, crystallization or other conventional processing methods and which have a calorific value of less than 2,000 kcal/kg and accordingly cannot be burnt completely without supporting flame, are suitable as aqueous effluents which can be burnt completely by the process according to the invention.

The content of organic constituents may be extremely small, for example in the case of aqueous effluents which have to be subjected to a combustion treatment only because of the toxicity or another undesirable property of a small portion of the effluent. Aqueous containing for example from 0.1 to 40 percent by weight of organic substances are suitable. Examples of inorganic salts or ions forming inorganic salts, for example carbonates, in the combustion are particularly alkali metal salts or alkali metal ions. Sodium ions and sodium salts of organic acids are particularly important examples. These salts may be contained in the effluents in considerable amounts, for example up to 50 percent by weight.

The water content of the effluents is as a rule from 50 to 95 percent by weight, and other solvents, particularly organic solvents, may be present as components. A specific example of a liquid which is suitable for combustion in accordance with this invention is the waste liquor from the oxidation of cyclohexane which contains 40 percent by weight of dry substance consisting of sodium hydroxide and sodium salts of low molecular weight monocarboxylic and dicarboxylic acids and having a calorific value of about 200 to 300 kcal/kg of dry substance.

The process according to the invention will now be described in detail with reference to two embodiments diagrammatically illustrated in the drawing.

Figure 1:
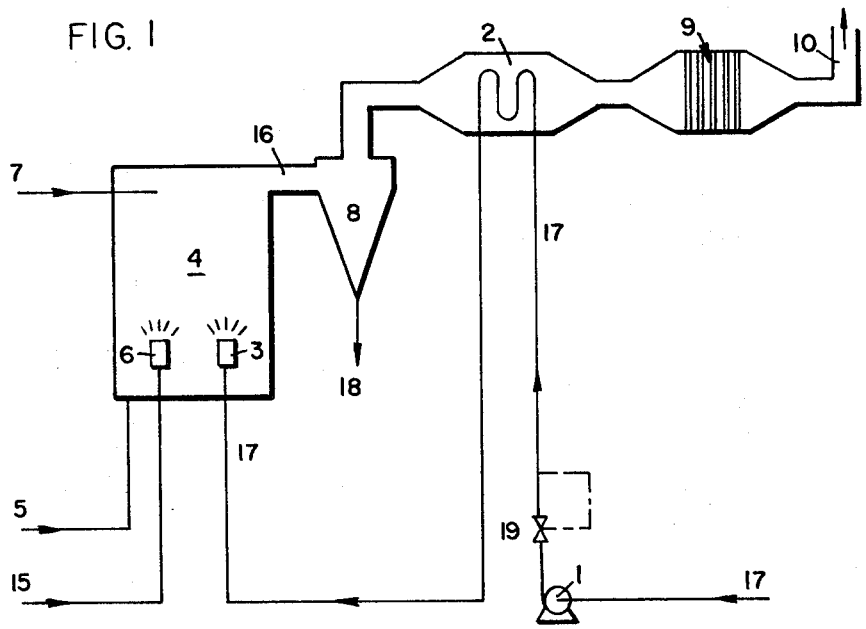
FIG. 1 shows a combustion plant in which the aqueous effluent is flashed and partly vaporized in the burner nozzle upon entry into the combustion chamber.

Referring to FIG. 1, the combustion plant used for carrying out the process according to the invention consists essentially of a combustion chamber 4, a burner nozzle 3 for supplying and burning the aqueous effluent, an offgas channel 16, a cyclone-type dust separator 8, an offgas cooler 2 downstream of the cyclone 8, a fine filter 9 and an offgas flue 10. When auxiliary fuel is to be added, an additional burner nozzle 6 is provided in the combustion chamber 4.

In the simplest case the aqueous effluent 17 is brought to a pressure higher than the combustion chamber pressure by a pump 1, heated by passage through an offgas cooler 2 generally to a temperature below the boiling temperature at the prevailing pressure and to at least the critical temperature at at least the critical pressure, and (after leaving the offgas cooler 2) is fed direct to the burner nozzle 3. The aqueous effluent 17 is flashed in the burner nozzle 3 and some of the liquid, is vaporized as a result of the pressure falling below the boiling pressure. The effluent/vapor mixture containing organic substances then passes in atomized condition into the combustion chamber 4 where the organic substances are burnt by means of the combustion air 5 also supplied to the combustion chamber 4. The additional burner nozzle 6 provided in the combustion chamber 4 serves for heating up the combustion chamber 4 by means of an auxiliary fuel 15 before the commencement of the combustion of the organic substances contained in the aqueous effluent 17 and in the case of effluents having very high water contents can also be used to support the combustion process. The offgas formed in the combustion in the combustion chamber 4 may be cooled by adding cooling air 7 prior to entry into the offgas channel 16 in order to cool below their melting point and to separate as dust any molten constituents present in the offgas which could cause soiling and corrosion of the heat-exchange surfaces of the offgas cooler 2. The offgas entering the offgas channel 16 is given a coarse purification from solid constituents in the downstream cyclone 8 and supplied to offgas cooler 2. The solid constituents 18 are removed at the lower end of the cyclone 8. A large part of the heat contained in the offgas is given up in the offgas cooler 2 to the aqueous effluent flowing on the coolant side through the offgas cooler 2 and thus serves to heat up the aqueous effluent to a temperature near to its boiling temperature at the prevailing pressure and at least to the critical temperature. A fine filter 9 and a flue 10 for the offgas are provided on the offgas side of the offgas cooler 2, and the offgas leaves the combustion plant through these. If the heating up of the aqueous effluent in the offgas cooler 2 is not sufficient to cool the offgas to flue temperature, it may be advantageous to interpose between the offgas cooler 2 and the offgas flue 10 a conventional waste heat boiler for the production of steam (not shown in the drawing).

The amount of aqueous effluent 17 passed through may be regulated either by providing, downstream of the pump 1, a pressure control valve 19 which keeps the pressure of the aqueous effluent upstream of the burner nozzle 3 constant, or by regulating the output of the pump or by keeping the pressure upstream of the burner nozzle constant by using an adjustable burner nozzle. Since as much as possible of the water contained in the aqueous effluent 17 should be vaporized by means of the heat absorbed in the offgas cooler 2, aqueous effluent having a high water content has to be heated to an appropriately high temperature in the offgas cooler. A high temperature is however associated with a high pressure because the boiling temperature of the aqueous liquid should not be exceeded in the offgas cooler (apart from supercritical conditions) in order to avoid for example deposition of dissolved salts in the vaporization of the effluent or overheating of the heat exchange surfaces. The expenditure involved in this in some cases, for example in the combustion of aqueous effluents having a strong corrosive action, and the problems as regards materials associated therewith, may be circumvented for example by flashing the aqueous effluent 17 according to FIG. 2 through a pressure relief valve 13 into a zone designed as an intermediate chamber 11 upstream of the combustion chamber 4 and the burner nozzle 3. In this way it is possible to keep the pressure and temperature of the aqueous effluent 17 in the offgas cooler 2 relatively low and to compensate for the disadvantage of a low rate of evaporation associated therewith by recycling a portion of the aqueous effluent 17 fed into the intermediate chamber 11 as a branch stream 21, i.e. by adding it, after the pressure has been raised in pump 12, to the aqueous effluent 17 supplied through pump 1 and the pressure control valve 19 to the offgas cooler 2. The amount of the recycled effluent branch stream 21 may be such that the total vaporization rate of the aqueous effluent 17 corresponds to the vaporization rate at appropriately high pressure, high temperature and single passage through the offgas cooler 2.

In the intermediate chamber 11 the liquid and vapor phases of organic substances formed by flashing the entering aqueous effluent 17 are separated from each other. The liquid phase of nonvaporized organic substances 20 is withdrawn at the bottom of the intermediate chamber 11 and divided into branch streams 14 and 21. While the branch stream 21 (as already described) is passed again through the offgas cooler 2, the branch stream 14 is supplied through a control valve 22 to a burner nozzle 3 provided in the combustion chamber 4. The intermediate chamber 11 upstream of the combustion chamber 4 is advantageously kept at a higher pressure than the combustion chamber pressure. In this case the vaporous phase 23 withdrawn from the intermediate chamber 11 may be supplied through a pressure control valve 24 to the burner nozzle 3 separately from the branch stream of liquid 14 and used as auxiliary vapor for atomizing the liquid branch stream 14. The vapor phase 23 may also be divided into branch stream 25 and 26, branch stream 25 serving to atomize the liquid branch stream 14 in the burner nozzle 3 and branch stream 26 serving for atomizing the liquid auxiliary fuel 15 in the additional burner nozzle 6. As already described in detail with reference to FIG. 1, the organic substances contained in the aqueous effluent (with or without auxiliary fuel 15) injected into the combustion chamber 4 is burnt by means of combustion air 5 also introduced into the combustion chamber. The offgas may have cooling air 7 supplied to it prior to entry into the offgas channel 16 in order to precipitate molten substances present in the offgas. The offgas freed from solids 18 in the cyclone 8 then passes through the offgas cooler 2 and the fine filter 9 into the offgas flue 10.

When aqueous effluents containing a larger amount of water and only a very small amount of dissolved substances are used, it should be borne in mind that the large amounts of stream introduced at the burner nozzles 3 and 6 isolate the combustible constituents from the combustion air 5 carrying the combustion oxygen or very greatly dilute the combustion air. Poor combustion of the mixture of fuel, air and steam would be the result. For this reason it is advantageous to inject that portion of stem 27 under superatmospheric pressure of the vapor phase 23 which is not required for atomizing liquids in the burner nozzles 3 and 6 into the offgas at a point downstream of the combustion zone while bypassing the burner nozzles 3 and 6. In this case it is only necessary to ensure that the offgas temperature downstream of the combustion zone is still high enough for the thermal destruction of the substances contained in the vapor portion 27 supplied. When auxiliary fuel is employed it may often be advantageous to mix the auxiliary fuel 15 with the liquid branch stream 14 upstream of the burner nozzle because in this case, after the atomization of the mixture and supply of the combustion air 5, a homogeneous flame is obtained as a matter of course.

The advantage of the process according to this invention over prior art methods consists primarily in the fact that both organic substances which are volatile in steam and organic substances which are not volatile in steam can be burnt completely in the combustion chamber 4. Since the aqueous effluent 17 is flashed to the lower pressure prevailing in the combustion chamber 4, part of the water and of the vaporizable organic constituents undergoes spontaneous vaporization in the burner nozzles 3 and 6. Owing to the formation of vapors the remaining portion of the liquid phase is divided into fine droplets and fed together with the vapor phase into the combustion chamber 4. As a result of its fine distribution the liquid phase occupies a large volume in the combustion chamber 4; this fact has a particularly favorable effect on rapid and complete combustion of the organic substances. Another advantage of the process according to this invention is that fuel is saved as a result of the fact that a vapor phase is obtained by flashing the effluent 17 to a lower pressure, that is to say the amount of heat required for bringing about partial vaporization is saved, the heat of the offgas from the combustion chamber being utilized. Since the pressure and temperature of the effluent 17 in the system upstream of the burner nozzles 3 and 6 are maintained at such a level that vaporization cannot occur, it is impossible for dissolved constituents to be precipitated from the effluent 17 and to cause fouling of the nozzle and the effluent cooler.

Further advantages of the process according to the invention will be evident from the following Examples.

EXAMPLE 1

The plant described with reference to FIG. 1 is used to burn a waste liquor consisting of 30 percent by weight of organic sodium salts and 70 percent by weight of water. The waste liquor is brought by means of pump 1 to pressure of about 200 atmospheres gauge and heated during passage through the offgas cooler 2 from an inlet temperature of about 40° C to about 360° C. The waste liquid is flashed from 200 atmospheres gauge to about 1 atmosphere absolute in the burner nozzle 3 so that about 62 percent of the water vaporizes and finely atomizes the residual liquid phase as it passes through the jet. Oil is added as auxiliary fuel 15 through the additional burner nozzle 6 and the mixture is burnt by means of combustion air 5 in the combustion chamber 4 at about 1,000° C. The offgas formed is mainly steam, soda and products formed in the combustion of the oil. Since soda does not solidify until the temperature has fallen to about 700° C, cooling air is blown into the offgas so that it is cooled to about 690° C. The offgas then passes through the cyclone 8 in which the soda is separated in powder form 18. The offgas is cooled in the subsequent offgas cooler to a flue temperature of about 200° C and is discharged through the offgas flue 10 after having passed through the fine filter 9.

EXAMPLE 2

Figure 2:
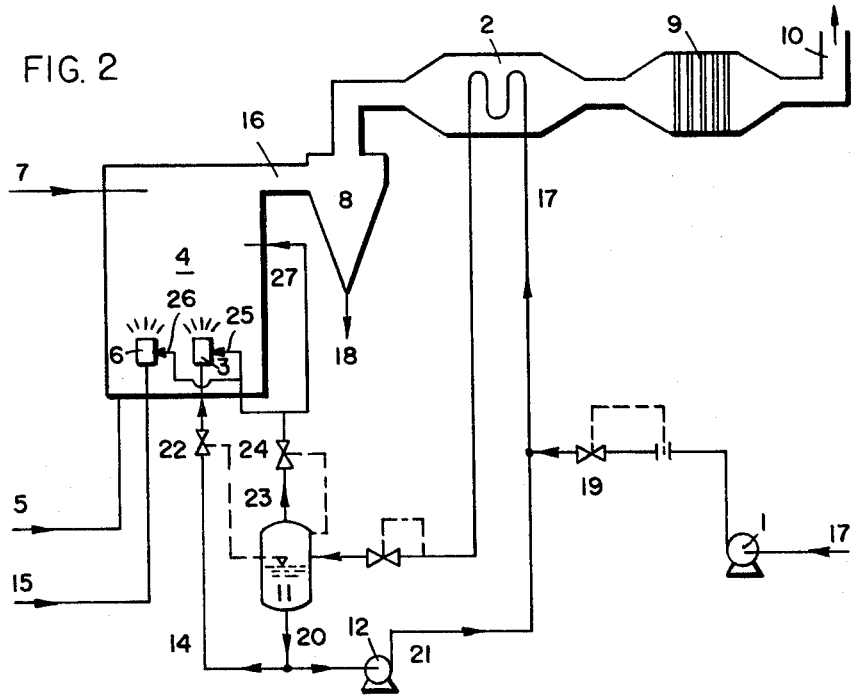
FIG. 2 shows an arrangement in which the aqueous effluent is flashed and partly vaporized in an intermediate container provided upstream of the burner nozzle.

The same liquor as in Example 1 (30 percent by weight of sodium salt and 70 percent by weight of water) is burned in a combustion plant according to FIG. 2. The waste liquor is brought by means of pump 1 to pressure of about 80 atmospheres gauge and heated to about 280° C by passage through the offgas cooler 2. Then the waste liquor is fed through the expansion valve 13 into the intermediate vessel 11 and flashed to a pressure of about 8 atmospheres gauge, so that a liquid phase and a vapor phase are formed. A branch stream 21 of the liquid phase 20 is again brought to a pressure of about 80 atmospheres gauge by means of pump 12 and again supplied to the offgas cooler together with fresh waste liquor. The remaining branch stream 14 of liquid is supplied to the burner nozzle 3 and injected by means of the branch stream 25 of the vapor phase 23 withdrawn from the intermediate vessel 11 into the combustion chamber 4. The branch stream 26 of the vapor phase 23 serves to atomize the oil supplied to the additional burner nozzle 6 as auxiliary fuel 15. The further course of the combustion process with cooling of the offgas and separation of soda is analogous to that described in Example 1.

The advantage of the method described in Example 2 over that described in Example 1 consists in the fact that the waste liquor in the offgas cooler 2 is heated to a very much lower temperature so that corrosive action of the waste liquor is also very much less. Since a lower temperature entails a lower liquid pressure, material stresses are far less in the process described in Example 2 then in the process described in Example 1.

In an analogous way, other substances contained in aqueous effluents may be heated up on the coolant side of the offgas cooler in the process described and, as described above, partly vaporized prior to combustion; examples are organic solvents and oils.

I claim:

1. A process for burning organic substances contained in aqueous effluents in a combustion chamber having an offgas cooler downstream thereof, the aqueous effluent being passed through the offgas cooler on the coolant side with or without the supply of additional heat, thereby heated under superatmospheric pressure and then fed into the combustion chamber, wherein the aqueous effluent in the offgas cooler is kept at a pressure which is higher than the combustion chamber pressure, heated to a temperature below the boiling temperature at the prevailing pressure and to at least the critical temperature at at least the critical pressure, and partly vaporized by expansion to a lower pressure and the resultant vapor phase of organic substances together with the nonvaporized organic substances is burnt in the combustion chamber at a temperature sufficient for complete combustion of the organic substances.

2. A process as claimed in claim 1 wherein the aqueous liquid is fed into the combustion chamber while adding an auxiliary fuel.

3. A process as claimed in claim 1 wherein flashing and partial vaporization of the aqueous effluent is carried out in the burner nozzle.

4. A process as claimed in claim 1 wherein the aqueous effluent is flashed to an intermediate pressure higher than the combustion chamber pressure and partly vaporized in a zone upstream of the burner nozzle and the resultant vapor phase of organic substances is supplied separately from the liquid phase of organic substances of the combustion chamber.

5. A process as claimed in claim 1 wherein the vapor phase obtained by flashing the aqueous effluent to a pressure higher than the combustion chamber pressure is supplied to the burner nozzles as auxiliary vapor for atomizing the liquid phase and liquid auxiliary fuel.

6. A process as claimed in claim 1 wherein the vapor phase obtained by flashing the aqueous effluent to a pressure higher than the combustion chamber pressure is supplied to the burner nozzles as auxiliary vapor for atomizing the liquid phase.

7. A process as claimed in claim 1 wherein the vapor phase obtained by flashing the aqueous effluent to a pressure higher than the combustion chamber pressure is supplied to the burner nozzles as auxiliary vapor for atomizing liquid auxiliary fuel.

8. A process as claimed in claim 1 wherein at least some of the vapor phase obtained by flashing the aqueous effluent to a pressure higher than the combustion chamber pressure is mixed with the flue gas in the combustion chamber while by passing the burner nozzles.

9. A process as claimed in claim 1 wherein liquid auxiliary fuel is mixed with the liquid phase of the aqueous effluent which has been flashed to a pressure higher than the combustion chamber pressure, prior to being fed into the burner nozzle.